(12) United States Patent
Hoebergen

(10) Patent No.: US 11,161,273 B2
(45) Date of Patent: Nov. 2, 2021

(54) METHOD FOR MANUFACTURING A WOOD COMPOSITE

(71) Applicant: HANDELSONDERNEMING WE-HA, PM Deurne (NL)

(72) Inventor: Wilhelmus Maria Hoebergen, JR Deurne (NL)

(73) Assignee: HANDELSONDERNEMING WE-HA, Deurne (NL)

( * ) Notice: Subject to any disclaimer, the term of this patent is extended or adjusted under 35 U.S.C. 154(b) by 16 days.

(21) Appl. No.: 16/334,049

(22) PCT Filed: Sep. 21, 2017

(86) PCT No.: PCT/NL2017/050626
§ 371 (c)(1),
(2) Date: Mar. 18, 2019

(87) PCT Pub. No.: WO2018/056813
PCT Pub. Date: Mar. 29, 2018

(65) Prior Publication Data
US 2019/0210245 A1    Jul. 11, 2019

(30) Foreign Application Priority Data

Sep. 23, 2016 (NL) ..................... 1042071

(51) Int. Cl.
| | |
|---|---|
| *B27N 3/28* | (2006.01) |
| *B29C 48/16* | (2019.01) |
| *B32B 21/00* | (2006.01) |
| *B32B 37/12* | (2006.01) |
| *B29K 101/10* | (2006.01) |

(52) U.S. Cl.
CPC ................ *B27N 3/28* (2013.01); *B29C 48/16* (2019.02); *B32B 21/00* (2013.01); *B32B 37/12* (2013.01); *B29K 2101/10* (2013.01); *B29K 2911/14* (2013.01)

(58) Field of Classification Search
CPC ............ B27N 3/28; B32B 21/00; B29C 48/16
See application file for complete search history.

(56) References Cited

U.S. PATENT DOCUMENTS

2012/0296014 A1    11/2012    Neon et al.

FOREIGN PATENT DOCUMENTS

| EP | 0 807 510 A1 | * | 11/1997 |
| EP | 0807510 A1 | | 11/1997 |
| WO | 01/72904 A2 | | 10/2001 |
| WO | WO 01/72904 A2 | * | 10/2001 |

OTHER PUBLICATIONS

International Search Report and Written Opinion for International Application No. PCT/NL2017/050626 dated Mar. 21, 2018.
MDI and TDI: Safety, Health and the Environment: A Source Book and Practical Guide. Edited by D C Allport, D S Gilbert and S M Outterside Copyright ?? 2003 John Wiley & Sons, Ltd. ISBN: 0-471-95812-3.

* cited by examiner

*Primary Examiner* — Robert D Harlan
(74) *Attorney, Agent, or Firm* — Tarolli, Sundheim, Covell & Tummino LLP

(57) ABSTRACT

Method for manufacturing a wood composite, comprising the steps of providing an reactive composite mixture (4) by mixing a reactive binder and vegetable fibres; supplying the reactive composite mixture to an extruder (5), discharging of the composite mixture from the extrusion device via an extrusion discharge (6) to a curing mould (8); filling the pores of the vegetable fibres with the reactive binder while simultaneously expensing the air from the pores at extrusion process conditions; reacting of the reactive binder around the vegetable fibres and in the pores of the vegetable fibres into a wood composite at the temperature of the extrusion process conditions.

14 Claims, 2 Drawing Sheets

A-A

METHOD FOR MANUFACTURING A WOOD COMPOSITE

RELATED APPLICATIONS

The present invention is a U.S. National Stage under 35 USC 371 patent application, claiming priority to Serial No. PCT/NL2017/050626, filed on 21 Sep. 2017; which claims priority of NL 1042071, filed on 23 Sep. 2016, the entirety of both of which are incorporated herein by reference.

DESCRIPTION

The invention relates to a method for manufacturing a plant-fibre-plastic composite material, in particular wood-based vegetable fibre composites. These composites are hereinafter referred to as wood composite.

Therefore, the hereinafter-used term wood composite (material) includes composite material comprising vegetable fibres (also referred to as plant fibres or (woody) cellulose fibres), including (hard)wood fibres, fax fibres, hemp fibres and/or coconut fibres; and a binder.

Until now, common types of wood-plastic composite materials (WPC) are pressed materials, consisting of (woody) vegetable fibres with a thermoplastic resin (polymer) as a binder. These conventional wood composite materials are mainly sold for use in platform parts, (timber) fencing parts, etc.

The production process of these widely used wood composite materials comprises: blending of vegetable fibres (usually wood fibres) with a granulate of polymeric thermoplastic material and supplying that mixture to a (heated) extrusion device, which is provided with an extrusion nozzle; followed by feeding the mixture into an open mould by means of the extrusion nozzle, and then followed by controlled cooling of the mixture in the open mould, which is air or water cooled, so that the mixture becomes a solid material, which can be cut and shortened to desired lengths.

In EP0807510, for the binder is used inter alia: polymers, plastics, resins or reaction products such as polyvinyl chloride (PVC), polystyrene (PS), polyethylene (PE) or polypropylene (PP). The binder is mixed with vegetable fibres in the form of wood flour in an extruder. Depending on the plastic applied, the extruder is heated to temperatures of about 65-95° C. for PVC and up to temperatures of about 130° C.-190° C. for PS. One disadvantage of this known method is the inadequate bonding between the vegetable fibres and the plastic, because the viscosity of the plastic at the process conditions is too high to allow the plastic to penetrate into the pores of the vegetable fibres. As a result, air remains trapped in the pores, which reduces the strength of the wood composite material and adversely affects its fire behaviour.

Therefore, the object of the present invention is to provide a method, and a reactive composite mixture therefor, for the manufacture of a wood composite product material having substantially improved properties, particularly in terms of the shape retaining properties (shrinkage and expansion), the pressure and heat resistance, and the strength and the fire behaviour.

For this purpose, the present invention proposes a method for manufacturing a wood composite product comprising the steps of:
 providing an amount or a stream of vegetable fibres;
 providing an amount or stream of reactive binder, the binder including a reactive component and/or a reactive prepolymer;
 mixing the reactive binder and the vegetable fibres into a reactive composite mixture and feeding the reactive composite mixture to an extrusion device;
 subjecting the reactive composite mixture to extrusion process conditions in the extrusion device;
 filling the pores of the vegetable fibres with the reactive binder while simultaneously expelling the air from the pores;
 reacting of the reactive binder around the vegetable fibres and within the pores of the vegetable fibres and forming a wood composite at the temperature of the extrusion process conditions.

Accordingly, a wood composite material is obtained having improved quality properties and high durability, which material is not, conventionally, made by physically mixing vegetable fibres with reacted (chemically inert) thermoplastic granulate, and subsequently heating and then extruding said mixture, and finally finishing off the material by cooling to obtain its solid form.

In the new method according to the invention, on the contrary, the extrusion device is used to preheat a mixture of vegetable fibres with a reactive binder, which includes reactive components and/or reactive prepolymers, and to form a homogenous composite mixture in the extrusion device by applying pressure. Subsequently the mixture is pressed through the extrusion discharge into a curing mould to form a rod or profile material. The composite mixture thus formed, which is still deformable at the extrusion discharge and which has started reacting and polymerizing, is subsequently maintained at the reaction temperature in the curing mould, thereby maintaining the reaction, so that the reaction product of the reactive binder optimally binds with the vegetable fibres.

Because the reactive binder within the extruder has a viscosity from about 0.1 mPa·s to about 100 mPa·s at the extrusion process conditions, the reactive binder enters the pores of the wood fibre and expels the air within the pores. Therefore, the reaction product of the reactive binder is extending both around and about the vegetable fibres as welt as is extending in the pores of the vegetable fibres within the formed wood composite product.

The use of a chemically reactive (curing) binder in the composite mixture, advantageously results in an absence of deformation of the formed wood composite product—after the binder has cured—due to the influence of heat and temperature, for example in very not weather. Shrinkage and expansion of the wood composite is very small. Also, deformation due to "creep" under the influence of pressure (differences) and compression is considerably less than when a finished reacted thermoplastic plastic is used as (physical) binder for the vegetable fibres, as has been customary until now.

The wood composite, without chemical additives, obtained by the manufacturing method according to the invention, is almost non-combustible, having the effect of increasing the safety of use and fire safety under fire conditions. This is contrary to wood composite material including a thermoplastic resin as a binder, for example high pressure polyethylene (HDPE).

Preferably, the extrusion process conditions include a temperature in the range from about 100° C. to about 200° C., and a pressure in the range from about 100 bar to about 3000 bar. At these process conditions, the air in the pores of the wood fibre is substantially displaced and replaced by the reactive binder having a low viscosity.

The weight ratio of vegetable fibres:reactive binder is in particular in the range from 8:2 to 99:1, Because the binder now also extends into the pores, a better connection (binding) between the vegetable fibres and the binder is established and a solid wood composite material with good properties is obtained having a high concentration of (porous) vegetable fibres.

The moisture content in the vegetable fibres is preferably adjusted to the range of about 5% to about 40% by weight; and more preferably from 15% to 20% by weight. When a moisture-curing binder is used, advantageously the moisture for curing is present in the wood and in its pores, guaranteeing a completion of the reaction in the pores and on the surface of the vegetable fibres.

In particular, the viscosity of the reactive binder is in the range from about 100 to about 500 mPa·s at 25° C. and 1 atm, and in the range from about 0.1 and 100 mPa·s at the extrusion process conditions. Due to its low viscosity at the extrusion process conditions, the reactive binder easily impregnates the vegetable fibres and penetrates into the pores of the vegetable fibres, thereby displacing the air, so that a solid and rigid wood composite material is formed regardless of the porosity of the applied vegetable fibres.

In an advantageous embodiment, a polyurethane-forming binder is used as the binder, wherein the reactive component and/or the reactive prepolymer includes reactive isocyanate (NCO) groups; in particular, the reactive component and/or the reactive prepolymer has an NCO content in the range of about 10 wt. % to about 40 wt. %. It has been found that isocyanate-based binders are very suitable due to their low viscosity at the extrusion process conditions, and also are easily curable under the influence of moisture prevent in the vegetable fibres, and additionally form a wood composite product, having improved properties.

In an alternative embodiment of the invention, the reactive binder contains a reactive component, which is selected from a reactive epoxy or reactive polyester. These reactive components likewise migrate at high pressure and temperature into the pores of the wood fibre in order to react or polymerize there.

In particular, the method comprises the step of compressing and subsequently curing the composite mixture in a curing mould, wherein the temperature in the curing mould corresponds to the temperature of the extrusion process conditions. More particularly, the method comprises the step of feeding the wood composite product from the curing mould to a slide element, wherein the temperature in the slide element corresponds to or is lower than the temperature of the extrusion process conditions.

By maintaining the wood composite longer at the reaction temperature, the (polymerization) reaction continues longer and a wood composite product is obtained having better properties.

The invention also relates to a wood composite material manufactured according to the method.

The invention also relates to a reactive composite mixture for use in the method according to the invention, including plant fibres and a reactive binder having a weight ratio in the range from 8:2 to 99:1, which reactive binder includes a reactive component and/or a reactive prepolymer, wherein the viscosity of the reactive binder is in the range from about 0.1 to 100 mPa·s at the extrusion process conditions in the extrusion device, so that the pores of the vegetable fibres are substantially filled with the reactive binder, and after reaction the pores are filled with the reaction product of the reactive binder. Preferably, the reactive binder includes components having reactive isocyanate (NCO) groups.

The invention also relates to an extrusion assembly, which is suitable for carrying out the method according to the invention, wherein a curing mould and/or a slide element is provided downstream behind the extrusion device.

The invention will now be described in more detail by means of the figure description hereinafter.

Figure 1:
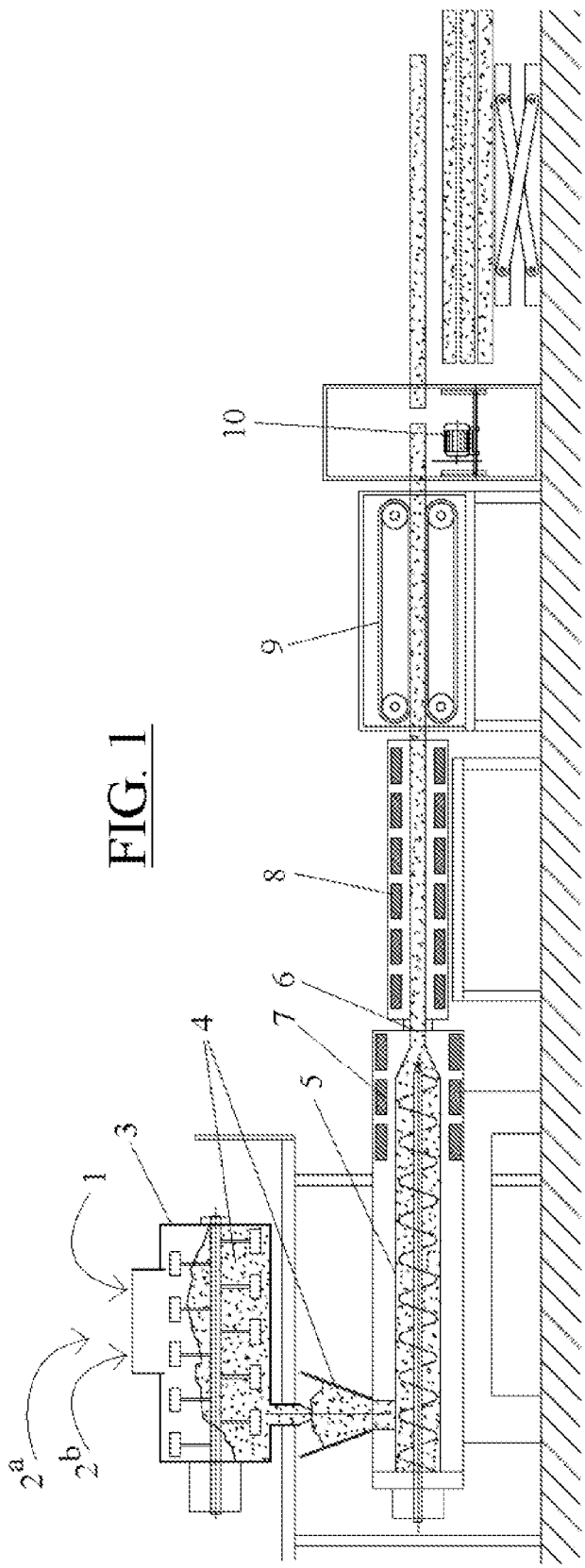
FIG. 1 shows an example of an extrusion device, suitable for carrying out the method according to the invention.

FIG. 1 shows an example of a device for the production of and for manufacturing a wood composite product according to the invention. Vegetable fibres 1 and at least one reactive binder having a reactive (monomeric) component 2a and/or a reactive prepolymer 2b and/or a reactive plastic precursor, which form a thermal curing or thermosetting polymer, are—batch-wise or continuously—fed to a mixing module 3, for example a paddle or blade mixer, in which the vegetable fibres 1 and the reactive binder including components 2a and 2b are mixed into a uniform mouldable reactive composite mixture 4. For example, the weight percentage of plant fibres is around 95% and the moisture content in the vegetable fibres is 15% by weight. A thermosetting resin is a polymer that cures and hardens by forming a 3-dimensional molecular network structure, so that thermosetting resins generally, unlike thermoplastics, will not become soft upon heating.

The reactive composite mixture 4 is then fed to an extrusion device 5—for example an extruder or screw press—and discharged from the extrusion device via an extrusion discharge 6 and pressed into a curing mould 8. The cross section of the pressed-out material 15 determined by the shape of the curing mould 8. The reactive composite mixture 4 is preheated during its stay in the extruder to, for example, about 60° C.—200° C. by means of heating elements 7, and the pressure is increased to 100—3000 bar. At these extrusion process conditions, the viscosity of the binder is reduced, for example from 400 mPa·s at 25° C. to 5 mPa·s at 160° C., which causes the binder to penetrate into the pores of the wood fibre and to expel the air from the pores.

Contrary to an extrusion method based on a thermoplastic material, which material becomes soft and/or plastic by heating, in the method according to the invention the binder cures under the influence of externally provided heat—heat supplied by, inter alia, the heating elements 7 in the extrusion device 5 and in the curing mould 8—by forming molecular cross-links, so that the composite mixture will cure and harden/solidify, by using a low viscosity reactive binder containing (at least) a reactive component, for example a moisture-curing reactive component or a reactive component that cures (polymerizes) by adding a catalyst. Under the influence of the heat radiated by the heating elements 7, the reactive composite mixture, consisting of the binder (with catalyst) and the vegetable fibres, begins to cure just upon leaving the extrusion device 5 so that the mixture—by applying the correct amount of heating energy and proper timing—is still sufficiently deformable and viscous to permit adopting (in cross-section) the shape of the curing mould 8, after passing the extrusion discharge 6.

By means of the curing mould 8, which is connected downstream of the extrusion discharge 6, the composite mixture is pressed into the curing mould by the extrusion discharge 6 and cured in the curing mould at a temperature of, for example, about 140° C.

After the composite mixture in the curing mould 8 has been exposed to a temperature of, for example, about 140° C. during the residence time, the composite mixture is sufficiently cured Into the wood composite product so that the product can be shortened and cut to desired lengths by means of, for example, a carrier belt 9 and a track saw 10.

Figure 2:
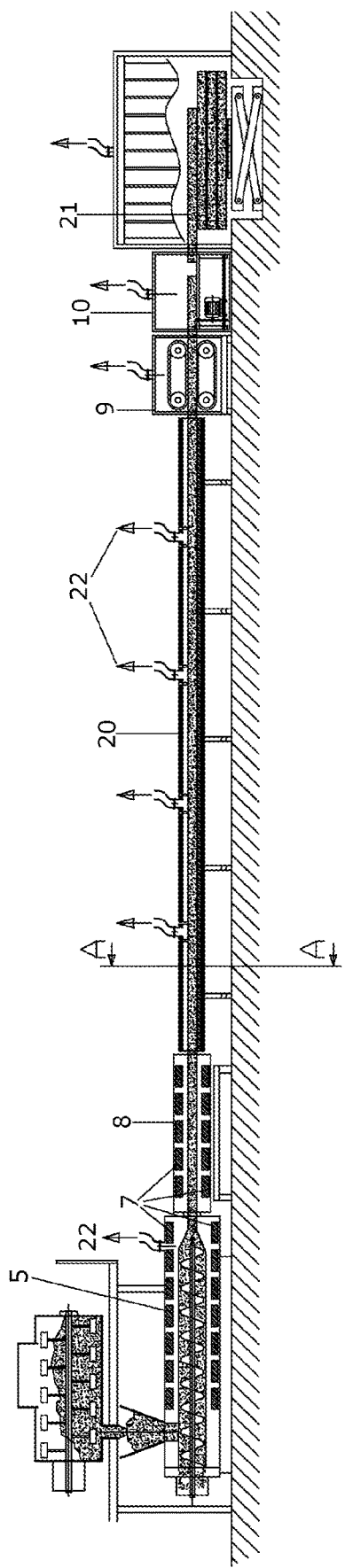
FIG. 2 shows a second embodiment of an extrusion device, suitable for carrying out the method.
Figure 2:
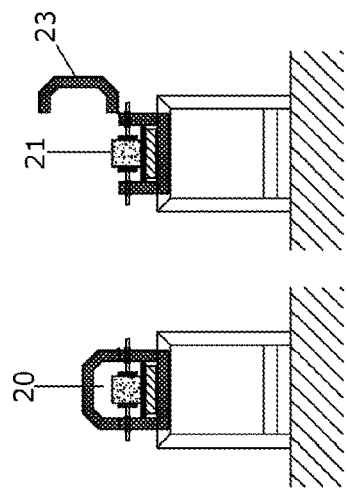

FIG. 2 shows an alternative configuration of an extrusion device 5 for carrying out the method according to the invention. Behind the curing mould 8 with heating elements 7 a slide 20 is provided, in which the wood composite product 21 formed, having the shape of a bar with a square cross section, is allowed additional residence time, so that the bar may further cure before further processing the product. Preferably, the slide is provided with a hood 23, which is provided with one or more vent apertures 22. In this embodiment, the extrusion device 5 is also provided with a vent aperture 22 where, among other things, the air being displaced from the pores of the vegetable fibres may be sucked out, cleaned and disposed of.

Hence according to the invention, a method is provided for manufacturing a wood composite product having substantially improved properties, in particular with regard to the shape retaining properties and the resistance against pressure and heat. According to the invention, instead of using a thermoplastic binder of a heat-melted or viscous non-reactive resin, a reactive binder having a reactive component is applied, i.e. a thermosetting binder that cures and remains hard/rigid by means of a chemical reaction by supplying heat (heating elements 7). By mixing plant fibres with a reactive binder, and by thoroughly mixing the reactive composite mixture in an extruder and pressing the binder into the pores of the vegetable material and subsequently pressing the reactive composite mixture by means of a curing mould into a bar or profile material and by chemically curing the mixture by heat, a woody bar or profile material is obtained with properties, which greatly exceed the properties of the wood composite materials known to date. The formed wood composite does not expand and does not shrink when changing the temperature, and it has a very favourable fire behaviour. Furthermore, the method is suitable for various types of plant materials including wood having different porosities, because the air is displaced from the vegetable fibres and the pores of the vegetable fibres are filled with reactive binder.

In a preferred embodiment, a (thermosetting) binder is used, which is based on polyurethane having isocyanate (NCO) groups. When a moisture-curable polyurethane composition is used, curing and polymerizing starts by the moisture present in the vegetable fibres, so that the addition of a separate catalyst is not necessary. Components such as MDI (4,4'-Methylene diphenyl diisocyanate) or TDI (2,4- or 2,6-Toluene diisocyanate) are suitable as polyurethane containing binder.

Optionally, it is also possible to use other reactive thermosetting binders having a low viscosity at the process conditions, which use permits impregnating the pores of the vegetable fibres with the reactive binder before the binder cures. Other known suitable thermosetting binders include alkyd resins, phenol formaldehyde, diallyl phthalate, melamine formaldehyde, polyester resins, urea formaldehyde, acrylic resins, epoxy resins.

The invention claimed is:

1. A method for manufacturing a wood composite, comprising the steps of:
   providing an amount or a stream of vegetable fibres;
   providing an amount or a stream of reactive, thermosetting binder, the reactive, thermosetting binder including a reactive component and/or a reactive prepolymer;
   mixing the reactive binder and the vegetable fibres into a reactive composite mixture and feeding the reactive composite mixture to an extrusion device;
   subjecting the reactive composite mixture in the extrusion device to extrusion process conditions;
   filling the pores of the vegetable fibres with the reactive, thermosetting binder while simultaneously expelling the air from the pores; and
   reacting of the reactive, thermosetting binder around the vegetable fibres and within the pores of the vegetable fibres and forming a wood composite at the temperature of the extrusion process conditions,
   wherein the viscosity of the reactive, thermosetting binder is in the range from about 0.1 to 100 mPa·s at the extrusion process conditions, and
   wherein the extrusion process conditions comprise a temperature in the range of about 100° C.-200° C., and comprise a pressure in the range of about 100-3000 bar.

2. The method according to claim 1, comprising the step:
   feeding the wood composite product into a curing mould, wherein the temperature in the curing mould corresponds to the temperature at the extrusion process conditions.

3. The method according to claim 2, comprising the step:
   feeding the wood composite product from the curing mould to a slide element, wherein the temperature in the slide element corresponds to or is lower than the temperature at the extrusion process conditions.

4. The method according to claim 1, wherein the weight ratio of vegetable fibres:reactive, thermosetting binder is in the range from 8:2 to 99:1.

5. The method according to claim 1, wherein the moisture content in the vegetable fibres is adjusted to a range of about 5% to about 40% by weight.

6. The method according to claim 1, wherein the viscosity of the reactive, thermosetting binder is in the range from about 100 to 500 mPa·s at 25° C.

7. The method according to claim 1, wherein the reactive component and/or the reactive prepolymer includes reactive isocyanate (NCO) groups.

8. The method according to claim 7, wherein the reactive component and/or the reactive prepolymer has an NCO content in the range from about 10 wt. % to about 40 wt. %.

9. The method according to claim 1, wherein the reactive component is selected from a reactive epoxy or reactive polyester.

10. A wood composite manufactured according to the method of claim 1.

11. A reactive composite mixture, for use in the method of claim 1, including plant fibres and a reactive, thermosetting binder having a weight ratio in the range from 8:2 to 99:1, which reactive, thermosetting binder includes a reactive component and/or a reactive prepolymer, wherein the viscosity of the reactive thermosetting binder is in the range from about 0.1 to 100 mPa·s at the extrusion process conditions in the extrusion device, so that the pores of the vegetable fibres are substantially filled with the reactive, thermosetting binder, and after the reaction the pores are filled with the reaction product of the reactive, thermosetting binder.

12. The reactive composite mixture according to claim 11, wherein the reactive, thermosetting binder includes components having reactive isocyanate (NCO) groups.

13. An extrusion assembly, which is suitable for carrying out the method according to the invention of claim 1, wherein a curing mould and/or a slide element is provided downstream behind the extrusion device.

14. The method according to claim 5, wherein the moisture content in the vegetable fibres is adjusted to a range of about 15% to 20% by weight.

\* \* \* \* \*